United States Patent [19]
Syohji

[11] 3,863,865
[45] Feb. 4, 1975

[54] MAGNETIC RECORDING-REPRODUCING DEVICE

[75] Inventor: Keisuke Syohji, Nagoya, Japan

[73] Assignees: Shin-Shirasuna Electric Corporation, Nagoya-shi, Japan

[22] Filed: Mar. 7, 1973

[21] Appl. No.: 338,731

[52] U.S. Cl. .................................. 242/209
[51] Int. Cl. .................. B11b 15/32, G03b 1/04
[58] Field of Search .................. 242/186-191, 242/209, 210; 274/4 R, 4 D, 11 R, 11 D; 179/100.2 R

[56] References Cited

UNITED STATES PATENTS

| | | | |
|---|---|---|---|
| 2,676,212 | 4/1954 | Williams | 179/100.2 R |
| 3,350,024 | 10/1967 | Karecki | 242/209 |

*Primary Examiner*—Leonard D. Christian

[57] ABSTRACT

In a magnetic recording-reproducing device, there is provided an automatic stop motion mechanism which comprises means for detecting the stoppage of rotation of one of two reel spindles and thereby unlocking a key or keys locked in depressed position for rotating said one reel spindle. There is further provided a mechanism for temporarily stopping transport of a tape during recording or reproducing operation. This mechanism comprises means adapted, when actuated, to move a pinch roller away from a capstan and interrupt transmission of the rotation from the capstan to said one reel spindle and to prevent said automatic stop motion mechanism from being operated by the interruption of the rotation of said one reel spindle.

3 Claims, 13 Drawing Figures

MAGNETIC RECORDING-REPRODUCING DEVICE

BACKGROUND OF THE INVENTION

1. Field of the Invention

This invention generally relates to a magnetic recording-reproducing device, and more particularly to a cassette type tape recorder having an automatic stop motion mechanism adapted, at the end of tape transport, to unlock one or two keys in depressed position to thereby mechanically shut off the device and simultaneously therewith, to cut off a current supply to a drive motor, and a mechanism for temporarily interrupting the tape transport during recording or reproduction.

2. Description of the Prior Art

In a cassette type tape recorder which uses a cassette containing therein a length of magnetic tape having the opposite ends thereof secured to a pair of reels, the magnetic tape might be broken or the drive system for the reel spindles might fail if the drive system remains operative with the magnetic tape having been completely taken up from one of the reels to the other. To avoid such dangers, various mechanisms have heretofore been proposed for rendering the drive system inoperative when the magnetic tape has been fully taken up on one of the two reels. These conventional mechanisms, however, have been complex in construction or unreliable in operation or required the provision of expensive parts.

SUMMARY OF THE INVENTION

It is a primary object of the present invention to provide a magnetic recording-reproducing device having a novel automatic stop motion mechanism which is simple in construction and reliable in operation as well as inexpensive to manufacture.

It is another object of the present invention to provide an improved automatic stop motion mechanism provided with means for detecting when one of two reel spindles has been stopped from rotating and thereby unlocking a key or keys locked in depressed position for rotating the reel spindles.

It is still another object of the present invention to provide a cassette type tape recorder provided with not only the described automatic stop motion mechanism but also a temporary stop motion or pause mechanism for temporarily interrupting transport of the tape during recording or reproduction.

It is yet another object of the present invention to provide a temporary stop motion mechanism comprising means adapted, when actuated, to move a pinch roller away from a capstan and interrupting transmission of rotation from the capstan to one of the reel spindles and means for preventing the automatic stop motion mechanism from being operated by the interruption of the rotation of said one reel spindle.

Other objects, features and advantages of the present invention will become fully apparent from the following detailed description taken in conjunction with the accompanying drawings.

DESCRIPTION OF THE PREFERRED EMBODIMENTS

Figure 1:
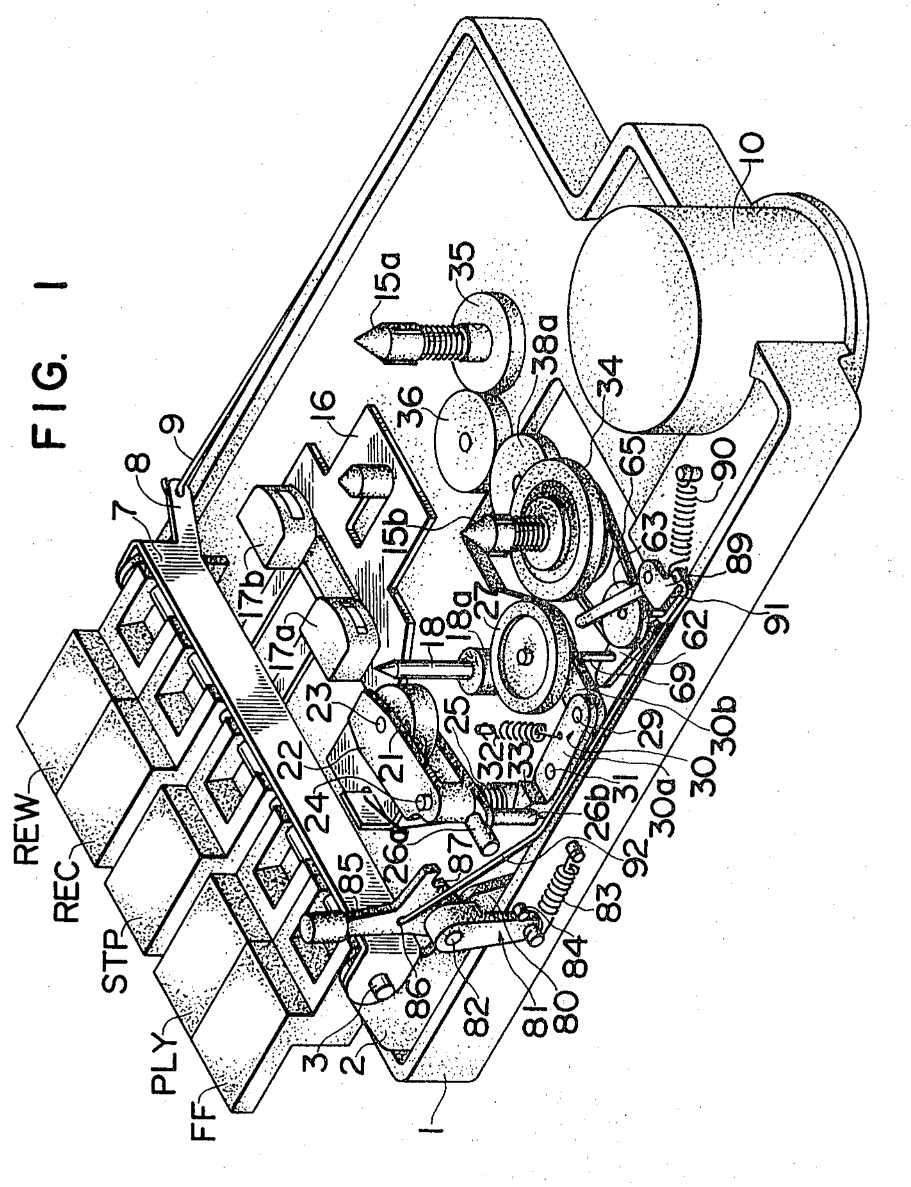
FIG. 1 is a schematic perspective view showing the drive system within the tape recorder according to the present invention.
Figure 2:
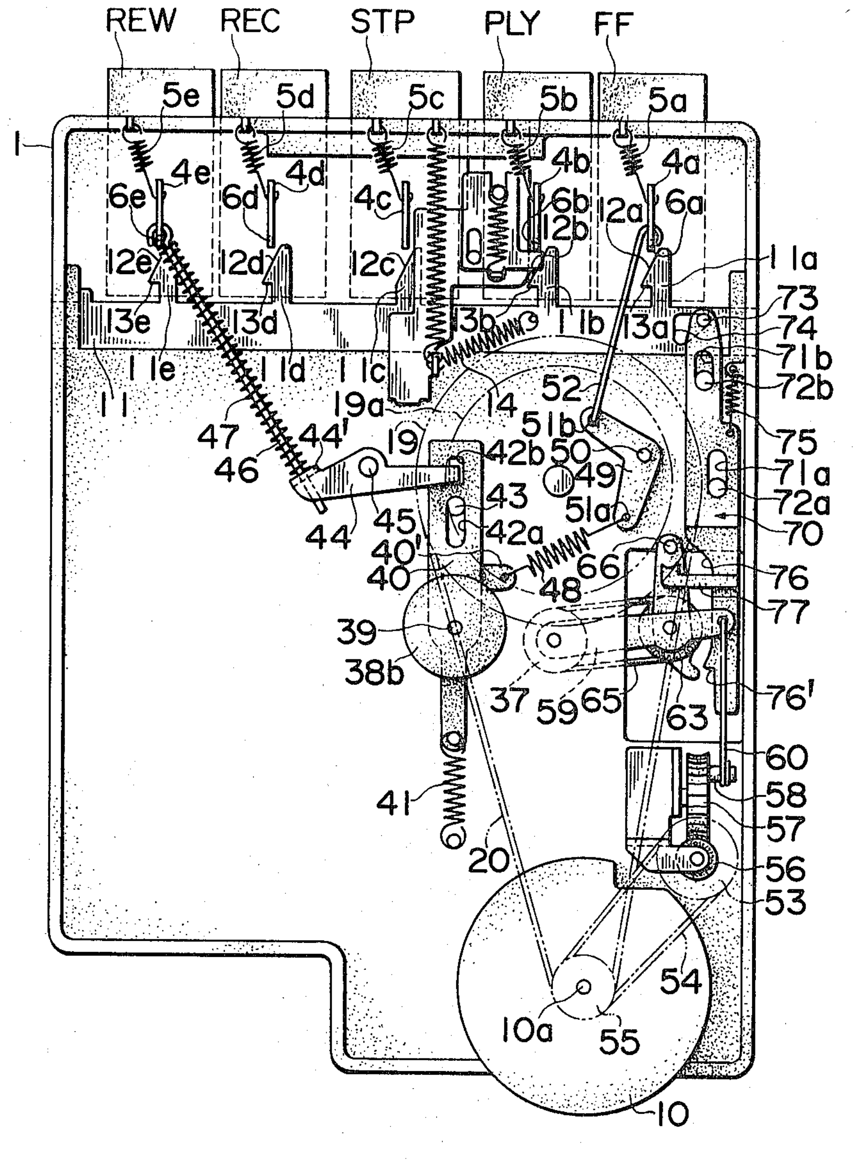
FIG. 2 is a schematic plan view showing the back side of the same tape recorder.

Referring to FIGS. 1 and 2, there is shown an example of the cassette type tape recorder embodying the present invention. In this embodiment, a chassis 1 formed of plastics or like material has a pair of spaced apart upright brackets 2 formed integrally therewith for rotatably supporting a common shaft 3. The shaft 3 mounts thereon various keys including fast-forward key FF, playback key PLY, stop key STP, record key REC and rewind key REW. As shown in FIG. 2, these keys FF to REW respectively have legs **4*a* to 4*e* extending downwardly therefrom through the underside of the chassis 1 and secured to one end wall of the chassis by means of springs 5*a* to 5*e*. Each key is normally held in horizontal position as shown in FIG. 1. The key legs 4*a*, 4*b*, 4*d* and 4*e* have their respective lower end portions formed to provide hook-shaped retaining portions 6*a*, 6*b*, 6*d* and 6*e*, respectively. An actuator plate 7 is also mounted on the shaft 3 and adapted to pivotally move with rotation of the shaft upon depression of the fast-forward key FF, the playback key PLY or the rewind key REW. The actuator plate 7 has a projection 8 formed at one end thereof and connected through a connecting rod 9 to a main switch (not shown) for a drive motor 10, so that when the actuator plate 7 is pivotally moved upon depression of one of said keys as described, the actuator plate actuates to close the main switch to energize the motor 10.**

As shown in FIG. 2, a lock lever 11 extends transversely of the chassis and is mounted on the underside of the chassis for sliding movement against the force of a spring 14. The lock lever 11 is provided with projections **11*a* to 11*e* projected to oppose the lower end portions of the legs 4*a* to 4*e* of the keys FF to REW. These projections 11*a* to 11*e* also have sloped edge faces 12*a* to 12*e*, respectively, and except the one which corresponds to the stop key STP, those projections have engaging portions 13*a*, 13*b*, 13*d* and 13*e* formed at the base thereof. Thus, depression of the fast-forward key FF, for example, will bring the lower end of the leg 4*a* thereof into engagement with the sloped edge face 12*a* of the projection 11*a* on the lock lever 11 to thereby move the lock lever 11 rightwardly as viewed in the figure against the force of the spring 14. Continued depression of the key FF will bring the lower end 6*a* of the leg 4*a* to the corresponding extremity of the sloped edge face 12*a*, whereupon the lock lever 11 will now be biased leftwardly by the spring 14 to bring the engaging portion 13*a* of the lever 11 into engagement with the retaining portion 6*a* of the leg 4*a* of the key FF, thereby locking the key FF in its depressed position. Such locked position may be released by depressing the stop key STP. If the stop key STP is depressed in that position, the lower end of its leg 4c will engage the sloped edge face 12c of the projection 11c on the lock lever 11 and eventually, the lock lever 11 will be moved rightwardly in the manner described above, thereby releasing the above-described engagement to permit the lock lever to be biased leftwardly to its original position by the spring 14.** In this way, the above-described locked position may be released. It will be apparent that this holds true of the other keys, i.e. playback key PLY, record key REC and rewind key REW.

As seen in FIG. 1, a pair of rotary spindles 15a and 15b are provided on top of the chassis 1 to receive thereon a conventional magnetic tape cassette (not shown) in a known manner. An auxiliary chassis 16 is provided forwardly of the keys and slidable toward the rotary spindles 15a and 15b upon depression of the playback key PLY. The auxiliary chassis 16 carries thereon a record-reproduce head 17a and an erase head 17b which are disposed in juxtaposed relationship. A capstan 18 is mounted adjacent the record-reproduce head 17a, and it is connected to a fly wheel 19 connected to the rotary shaft 10a of the motor 10 by means of a belt 20, as shown in FIG. 2. A pinch roller 21 is adapted to engage the capstan 20 and rotatably mounted on a mount 22 by means of a shaft 23. The mount 22 is provided with a horizontally extending pin 26a and a vertically extending pin 26b, both being adjacent to a shaft 24. The mount 22 is pivotable about the shaft 24 in response to the sliding movement of the auxiliary chassis upon depression of the playback key PLY so as to urge the pinch roller 21 into contact with the capstan 18.

An idler 27 is provided adjacent the capstan 18 and rotatably mounted on one end of a linkage 30 which comprises two arms 30a and 30b connected together by a pin 29. The arm 30a of the linkage 30 has the free end portion thereof pivotally mounted on the chassis 1 by means of a shaft 31 and has an intermediate portion connected to the chassis by a spring 32. The free end of the arm 30a is formed with an integral projection 33 which is engaged by the vertical pin 26a of the pinch roller mount 22 to thereby bias the arm 30a into an angularly rotated position about the shaft 31 against the force of the spring 32, and accordingly space the idler 27 on the arm 30b apart from the lower larger-diameter portion 18a of the pinch roller 18 and from a roller 34 securely mounted on the rotary spindle 15b. In the position of FIG. 1, depression of the playback key PLY will pivotally move the pinch roller mount 22 about the shaft 24 to thereby bring the pinch roller 21 into engagement with the capstan, as described above. As a result, the vertical pin 26b of the mount 22 will be disengaged from the projection 33 of the arm 30a to permit the latter to be pivotally moved about the shaft 31 by the spring 32 so as to bring the idler 27 into engagement with the larger-diameter portion 18a of the capstan 18 and with the roller 34 on the rotary spindle 15b. The depression of the playback key PLY has energized the motor 10 by that time, and the drive of the motor 10 may be transmitted via the belt 20, fly wheel 19, capstan 18, idler 27 and roller 34 to the rotary spindle 15b, which will thus be rotated to drive a reel (not shown) on the rotary spindle 15a so that a length of magnetic tape (not shown) may be transported therefrom in contact with the heads 17a and 17b and through between the capstan 18 and the pinch roller 21 until the tape is progressively taken up on a reel (not shown) mounted on the rotary spindle 15b.

The rotary spindle 15a also has a roller 35 secured to the lower end portion thereof. An idler 36 is provided in opposed relationship with the roller 35. The rotary spindle 15b has a further roller 37 secured thereto below the roller 34, the roller 37 having a diameter smaller than that of the roller 34 (see FIG. 3). Between the smaller-diameter roller 37 and the idler 36 there is provided a roller 38a for changing the direction of transport of the magnetic tape (see FIG. 1). Underlying the roller 38a and aligned therewith is a similar roller 38b (FIG. 2), the two rollers 38a and 38b being rotatably mounted on a movable support member 40 by means of a common shaft 39. The lower roller 38b is adjacent the reduced portion 19a of the fly wheel 19.

As is best shown in FIG. 2, the movable support member 40 carrying the pair of rollers 38a and 38b in the described manner has one end thereof connected to the chassis 1 by a spring 41 and is slidably held to the chassis by suitable means (not shown) against detachment. The other end of the movable support member 40 is formed with slots 42a and 42b therein. The slot 42a receives therein a guide pin 43 studded in the chassis 1. The other slot 42b is engaged by an upwardly bent end of a connector member 44 pivotally mounted on the chassis by means of a pin 45. The other end of the connector member 44 is also upwardly bent and formed with an aperture (not shown) for receiving therein one end of a connecting rod 46 having the other end thereof hooked into an aperture (not shown) formed in the leg 4e of the rewind key REW. A spring 47 is wound on the connecting rod 46 and has the opposite ends thereof engaged with the bent end 44' of the connector member 44 and the leg 4e of the rewind key REW, respectively.

The movable support member 40 has a laterally extending projection 40' integrally formed substantially centrally thereof. The projection 40' is formed with an aperture for retaining one end of a spring 48, the other end of which is retained in an aperture 51a formed in one end portion of a connector member 49 pivotally mounted on the chassis 1 by means of a shaft 50. The other end portion of the connector member 49 is also formed with an aperture 51b for retaining one end of a connecting rod 52 having the other end thereof retained in an aperture (not shown) formed in the leg 4a of the fast forward key FF.

In the position of FIG. 1, when the fast-forward key FF is depressed, this key is locked by the lock lever 11 in the manner described hereinbefore, and at the same time the movable support member 40 is biased by means of connecting rod 52, connector member 49 and spring 48. Since the biasing force takes place in an oblique direction with respect to the length of the movable support member 40, this support member is caused to slide toward the lock lever 11 and slightly rotate counter-clockwise about the guide pin 43 as viewed in FIG. 2. As a result, the lower roller 38b carried by the movable support member 40 is brought into engagement with the reduced portion 19a of the fly wheel 19 while the upper roller 38a is brought into engagement with the smaller-diameter roller 37 on the rotary spindle 15b. Thus, the drive of the motor 10 is transmitted via the belt 20, fly wheel 19, lower roller 38b, upper roller 38a and smaller-diameter roller 37 to the rotary spindle 15b, which is thereby rotated so that the magnetic tape wound on the rotary spindle 15*a* side is fast-forwarded to the rotary shaft 15*b* side.

When the rewind key REW is depressed, the connecting rod 46 connected thereto is extended through the aperture formed in the end portion 44' of the connector member 44, with a result that the spring 47 is compressed to thereby pivot the connector member 44 counter-clockwise about the shaft 45, as viewed in FIG. 2. This counter-clockwise pivoting of the connector member 44 causes the movable support member 40 to be substantially rectilinearly biased toward the lock lever 11, whereby the lower roller 38*b* is engaged with the reduced portion 19*a* of the fly wheel 19 while the upper roller 38*a* is now engaged with the idler 36 which is disposed in contact with the roller 35 on the rotary spindle 15*a*. Thus, the drive of the motor 10 is imparted via the belt 20, fly wheel 19, lower roller 38*b*, upper roller 38*a*, idler 36 and roller 35 to the rotary spindle 15*a*, so that the magnetic tape wound on the rotary spindle 15*b* side is rewound on the rotary spindle 15*a* side.

Figure 3:
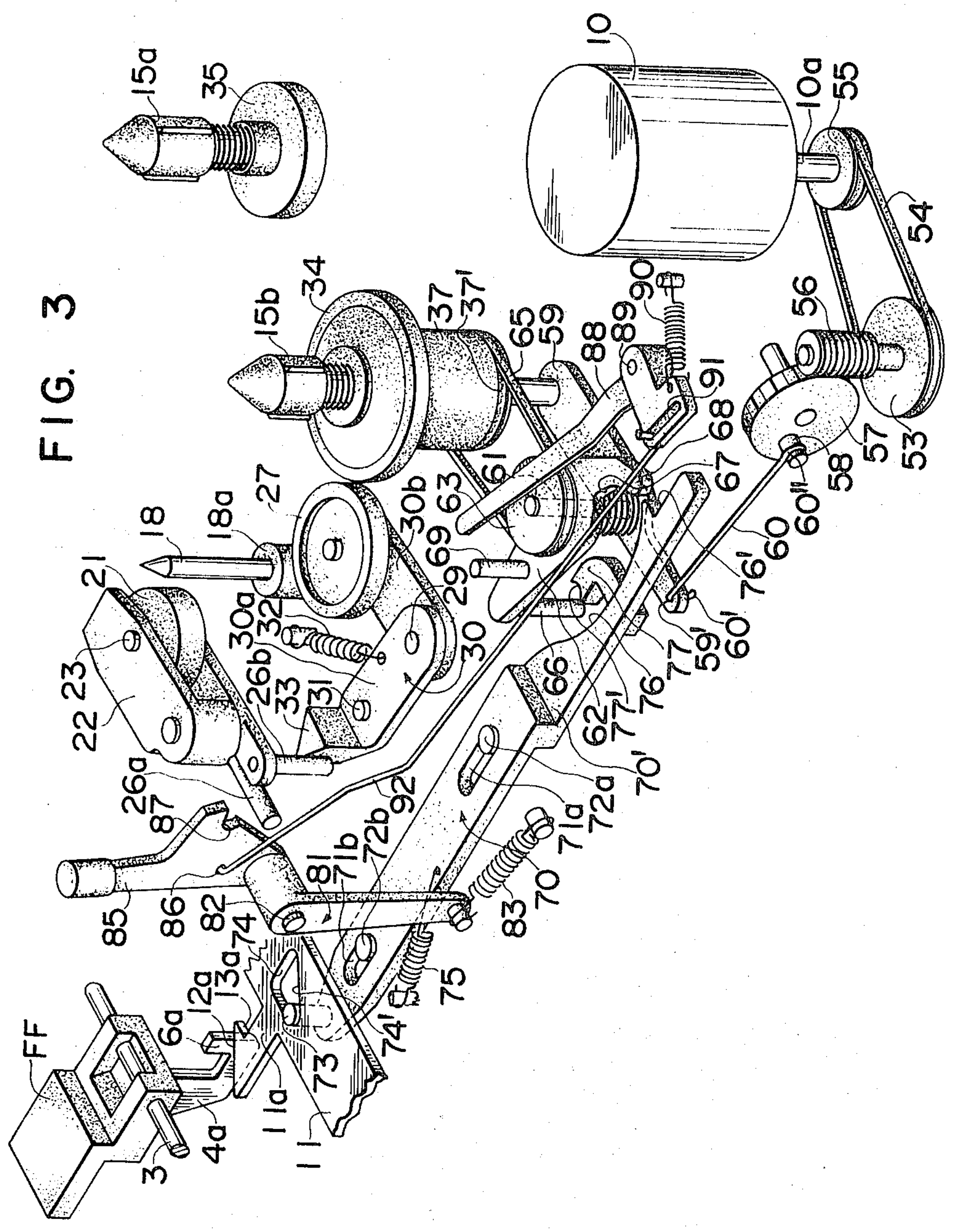
FIG. 3 is an enlarged, schematic, perspective view of the automatic stop motion mechanism according to an embodiment of the present invention.

Referring now to FIG. 3, there is shown a form of the automatic stop motion or shut-off mechanism according to the present invention. In this embodiment, a pulley 53 is rotatably mounted in the vicinity of the motor 10, and a belt 54 connects the pulley 53 to a pulley 55 mounted on the motor shaft 10*a* at the lower end thereof. A pinion 56 is vertically disposed and secured to the pulley 53. A gear 57 is mounted for rotation in a vertical plane and meshes with the pinion 56. The gear 57 has an eccentric pin 58 studded therein.

An actuator arm 59 is provided below the lower smaller-diameter roller 37 on the reel spindle 15*b* and pivotally mounted at one end thereof. The free end portion of the arm 59 is formed with an aperture 59' which is engaged by the bent end 60' of a connecting rod 60. The other end of the connecting rod 60 is secured to the eccentric pin 58 on the gear 57, as indicated at 60''. A shaft 51 extends vertically upwardly from the arm 59 adjacent the free end portion thereof and is fixed thereto. An actuator member 62 is loosely mounted on the shaft 61 above the arm 59. A pulley 63 is also rotatably mounted on the shaft 61 above the actuator member 62. a coil spring 64 is provided on the shaft 61 between the arm 59 and the actuator member 62 to upwardly bias the actuator member 62 into light pressure contact with a pulley 63 with a suitable frictional member (not shown) interposed therebetween. A belt 65 extends over the pulley 63 and over a peripheral groove 37' formed on the smaller-diameter roller 37 on the reel spindle 15*b* so that rotation of the reel spindle 15*b* may cause rotation of the pulley 63 in the same direction.

The actuator member 62 has an actuator pin 66 downwardly extending therefrom and disposed at the end remote from the shaft 61. The actuator member 62 is notched in its end portion adjacent the shaft 61, as indicated at 67, so as to provide a tail-like portion 68. Further, the actuator member 62 has a pin 69 upwardly extending therefrom and disposed between the downwardly extending actuator pin 66 and the shaft 61. the pin 69 is cooperable with temporary stop motion means of the present invention which will be described hereinafter.

A slider bar 70 is provided near the actuator member 62 and extends substantially perpendicularly to the lock lever 11. The slider bar 70 is formed with slots 71*a* and 71*b* for respectively receiving pins 72*a* and 72*b* extending from the chassis 1, the top ends of these pins having support fittings (not shown) attached thereto to prevent the slider bar from falling of its own gravity. A pin 73 extends upwardly from the slider bar 70 at the forward end thereof and is received into a triangular opening 74 formed in the end portion of the lock lever 11. The slider bar 70 is biased by a spring 75 in such a manner that the pin 73 thereof is positioned at one corner of the triangular opening 74 in the lock lever 11 which has an oblique side 74'. That portion of the slider bar 70 which is adjacent the actuator member 62 may be formed into a stepped portion 70' which has an inner side edge curved such as shown at 76 and has a rear end notched as at 76'. The cut-away 76' may simply be formed as a curved surface. An arm 77 extends laterally from the underside of the stepped portion 70' of the slider bar 70 and perpendicularly with respect to the longitudinal axis of the slider bar, thence it is bent so as to be substantially parallel to said longitudinal axis. The end face of the arm 77 is formed to provide a concavity 77' .

Figures 4A, 4B, 4C:
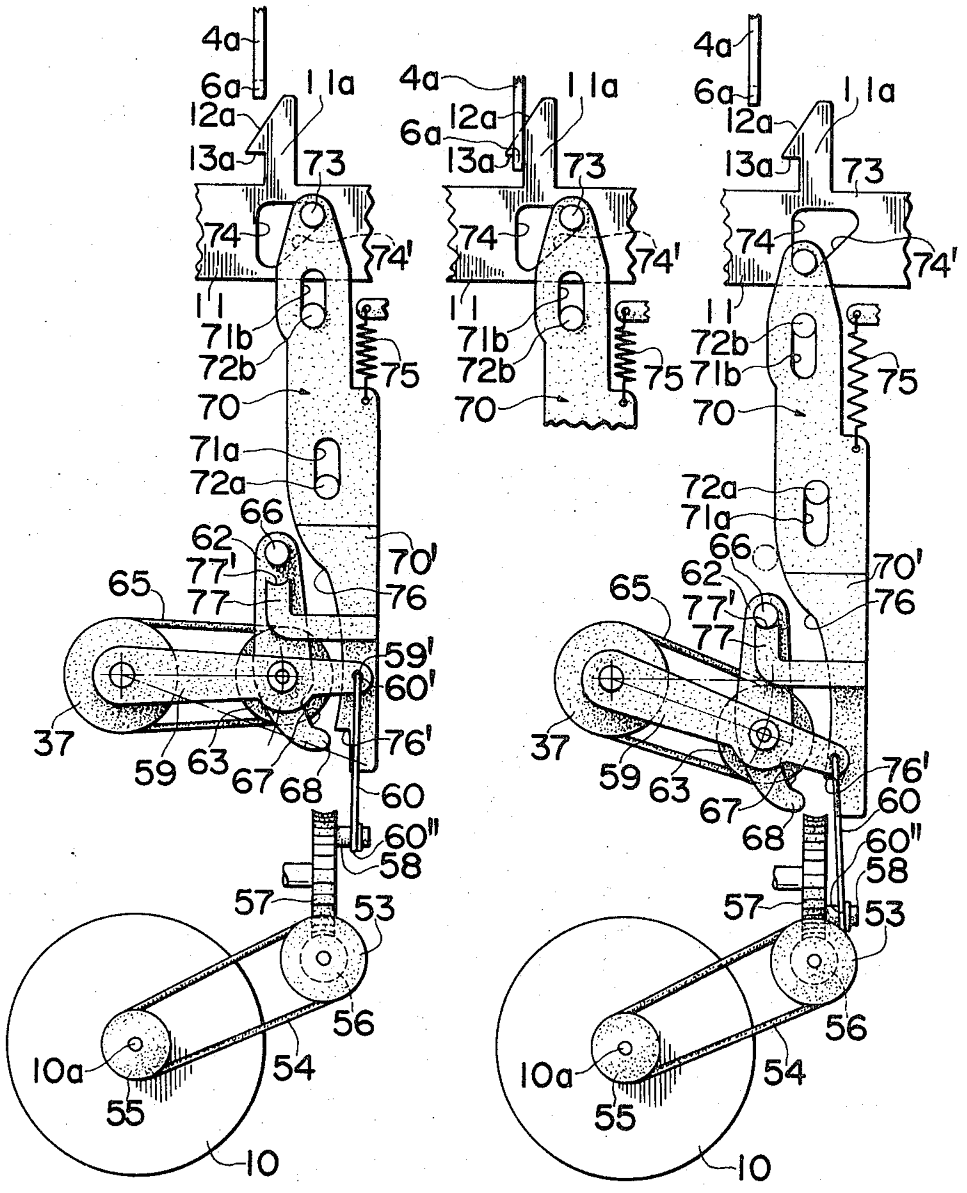
FIGS. 4(A), (B) and (C) and FIGS. 5(A) and (B) schematically illustrate the operation of the mechanism shown in FIG. 3.
Figure 5B:
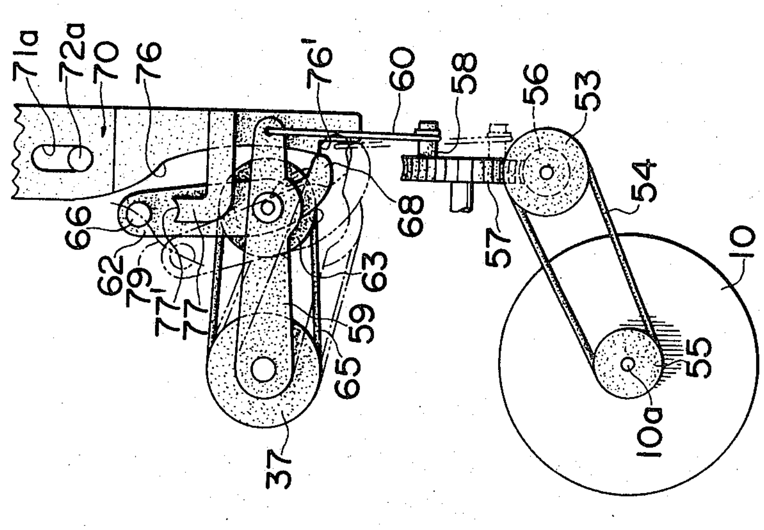
Figure 5A:
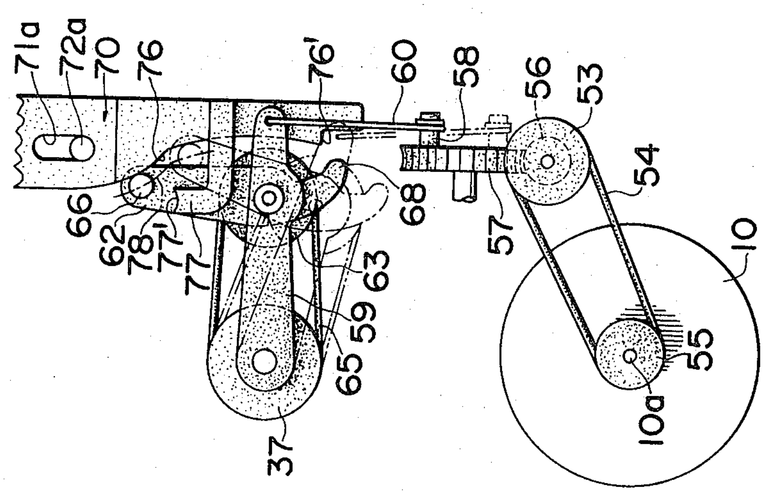

Operation of the automatic stop motion mechanism according to the present invention will now be described. In the position of FIG. 1 where none of the keys FF to REW is depressed, the lock lever 11 and the slider bar 70 are in such a relationship as shown in FIG. 4(A). When a key, e.g. fast-forward key FF is depressed, the leg 4*a* thereof is engaged with the lock lever 11 in the manner as shown in FIG. 4(B), and at the same time the motor 10 is energized, as described previously, to thereby rotate the reel spindle 15*b* counter-clockwise as viewed in FIG. 1. If the reel spindles 15*a* and 15*b* are loaded with a tape cassette, a magnetic tape within the cassette will be fast-forwarded from the take-up reel spindle 15*a* side to the supply reel spindle 15*b* side. During that while, the drive of the motor is transmitted via the pulley 53 and pinion 56 to the gear 57 meshing with the pinion, so that the arm 59 connected to the gear 57 by the connecting rod 60 is pivotally moved in a horizontal plane together with the actuator member 62 resting thereabove with the spring 64 interposed therebetween. In this case, the described counter-clockwise rotation of the reel spindle 15*b* is imparted via the belt 65 to the pulley 63 which is in contact with the actuator member 62 with a suitable frictional member interposed therebetween, and thus the pulley 63 is also rotated in the same direction as the reel spindle 15*b*. This means that the actuator member 62 is being subjected to a biasing force which tends to rotate it counter-clockwise as viewed in FIG. 1. Therefore, the said pivotal movement of the actuator member takes place in the manner as shown in FIG. 5(A). More specifically, the pivotal movement takes plate between a solid-line position in which the pin 66 on the actuator member 62 is substantially colinearly aligned with the end portion 77' of the arm 77 extending from the slider bar 70 and a phantom-line position in which the pin 66 on the actuator member 62 bears against the curved side edge 76 of the slider bar 70. It should be noted here that the pin 66 of the actuator member 62 is controlled by the curved surface 76 of the slider bar 70. In this way, during the fast-forward operation, the pin 66 of the actuator member 62 follows a path as indicated by a chain line 78 in FIG. 5(A), without engaging the arm 77 of the slider bar 70. However, when the tape has been fully taken up from the reel spindle 15*a* side to the reel spindle 15*b* side, the reel spindle 15*b* is stopped to nullify the above-described biasing force which has been imparted to the actuator member via the belt 65 and pulley 63. As a result, the actuator member 62 assumes the solid-line position as shown in FIG. 5(A) and is rectilinearly biased by the pivotal movement of the pivotable arm 59 to engage the pin 66 with the concavity 77' of the arm 77 of the slider bar 70. With such engagement maintained, the actuator member 62 is further biased and accordingly, the slider bar 70 is also biased in the same direction. As the slider bar 70 is so biased, the pin 73 provided at the end thereof is moved from the position of FIG. 4(B) to the position of FIG. 4(C) along the oblique side 74' of the triangular opening 74 in the lock lever 11. This movement of the pin 73 on the slider bar 70 causes the lock lever 11 to be biased upwardly as viewed in FIG. 4, to thereby completely release the engagement between the depressed key leg and the lock lever in the manner as shown in FIG. 4(C), thus permitting return of the key to its normal or undepressed position as shown in FIG. 1. In the meantime, the actuator member 62 is displaced in such a direction that the pin 66 thereon is moved away from the concave end 77' of the arm 77. Thus, the lock lever 11 and the slider bar 70 are returned to their original positions by the springs 14 and 75, respectively, to thereby restore the position as shown in FIG. 4(A).

During recording or reproduction, the same operation as that described above may take place except that upon unlocking of the associated key the heads 17*a* and 17*b* are retracted and the pinch roller 21 spaced apart from the capstan 18.

During rewinding, the drive of the motor 10 is transmitted to the supply reel spindle 15*a* to rotate this spindle clockwise as viewed in FIG. 1. Thereby, the tape wound on the take-up reel spindle 15*b* side is transported to the supply reel spindle 15*a* side and such tape transport causes the take-up reel spindle 15*b* to be rotated in the same direction as the supply reel spindle 15*a*. As a result, a biasing force in the direction opposite to that during the fast forward operation is imparted to the actuator member 62 via the belt 65 and pulley 63, so that the acutator member 62 is pivotally moved between the solid-line position and the phantom-line position shown in FiG. 5(B). In this case, it should be noted that the tail-like end portion 68 of the actuator member 62 is controlled by the cut-away or curved portion 76' of the slider bar 70. Thus, during rewinding, the pin 66 of the actuator member 62 follows a path as indicated by a chain line 79 in FIG. 5(B), without engaging the arm 77 of the slider bar 70.

It will be readily apparent to those skilled in the art that unlocking of the lock lever at the end of the tape rewind operation is accomplished just in the same way as noted above with repect to the fast-forward operation.

An example of the temporary stop motion or pause mechanism according to the present invention will now be discussed by reference to FiGS. 1, 3 and 6. As can be seen in FIG. 1, an upright bracket 80 provided on the chassis 1 supports an actuator member 81 for rotation about a shaft 82. The lower end of the actuator member 81 is biased by a spring 83 connected to one side of the chassis and one side edge of that lower end is engaged with a stop member 84 provided on said one side of the chassis. A shank portion 85 above the shaft 82 is formed with an aperture 86. The shank portion 85 of the actuator member 81 is also formed with a recess 87 for engagement with the horizontal pin 26*a* extending from the pinch roller mount 22. Adjacent the actuator member 62, a control arm 88 is pivotally mounted on the chassis 1 by means of a shaft 89. One end of the arm 88 is bizsed by a spring 9 connected to the chassis 1, and the arm 88 is spaced apart from the pin 69 on the actuator member 62 so that the end of the arm 88 may not interfere with that pin 69 during the previously described pivotal movement of the actuator member 62. The arm 88 is formed with an elongated slot 91 at the other end thereof. The actuator member 81 is connected to the arm 88 by a connecting rod 92 having one end engaged in the aperture 86 of the actuator member 81 and the other end engaged in the slot 91 of the arm 88.

Figure 6B:
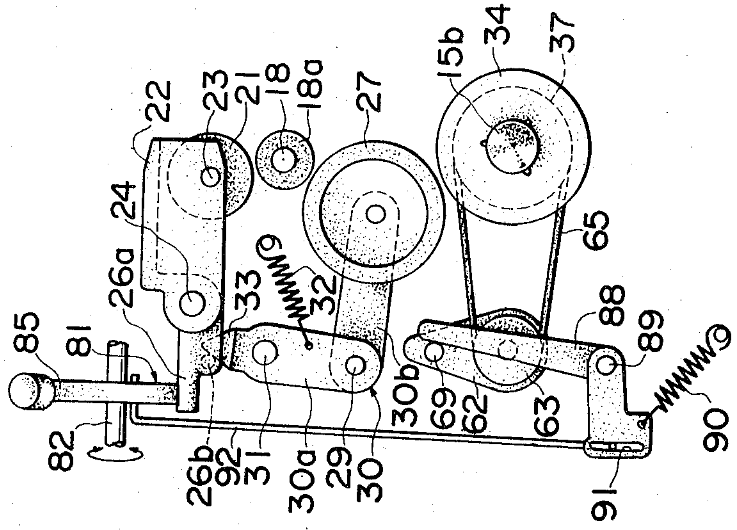
FIGS. 6(A) and (B) schematically show the temporary stop motion or pause mechanism according to the present invention.
Figure 6A:
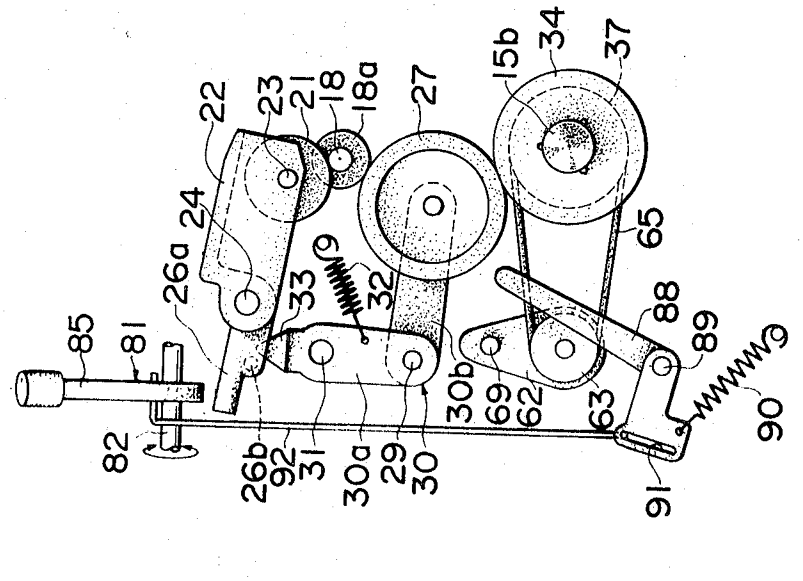

Operation of the above-described temporary stop motion or pause mechanism will now be described with reference to FIG. 6. FIG. 6(A) shows the recording or reproducing mode in which the playback key PLY is depressed with the pinch roller 21 urged into contact with the capstan 18. If, in this position, it is desired to temporarily stop the transport of the magnetic tape, the shank portion 85 of the actuator member 81 is gripped and pivoted forwardly, as shown in FIG. 6(B), until the recess 87 thereof (FIG. 3) is engaged with the horizontally extending portion 26*a* of the pinch roller mount 22. Continued pivoting of the actuator member 81 causes the pinch roller mount 22 to pivot about its shaft 24 in such a direction that the pinch roller 21 is moved away from the capstan 18. Then, the pinch roller mount 22 is locked in such pivoted position by the engagement between the horizontal pin 26*a* thereof and the recess 87 of the actuator member 81 and by the force of the spring 25 (FIG. 1). Of course, in this position, the idler 27 is spaced apart from the lower enlarged portion 18*a* of the capstan 18 so that the reel spindle 15*b* makes no rotation. The control arm 88 connected to the actuator member 81 is biased into engagement with the upwardly projected pin 69 on the actuator member 62 by the force of the spring 90 so that a control force in the same direction as that of the biasing force imparted to the actuator member during rotation of the reel spindle 15*b* is imparted to the actuator member 62 through the pin 69. This prevents the tendency of the pin 66 of the actuator member 62 to engage the concavity 77' of the arm 77 of the slider bar 70 due to the stoppage of the reel spindle 15*b*, thus preventing the lock lever from releasing its locking with respect to the playback key PLY. When the actuator member 81 is returned from its position of FIG 6(B) to its position of FIG. 6(A), the tape transport is again started.

Figure 7A:
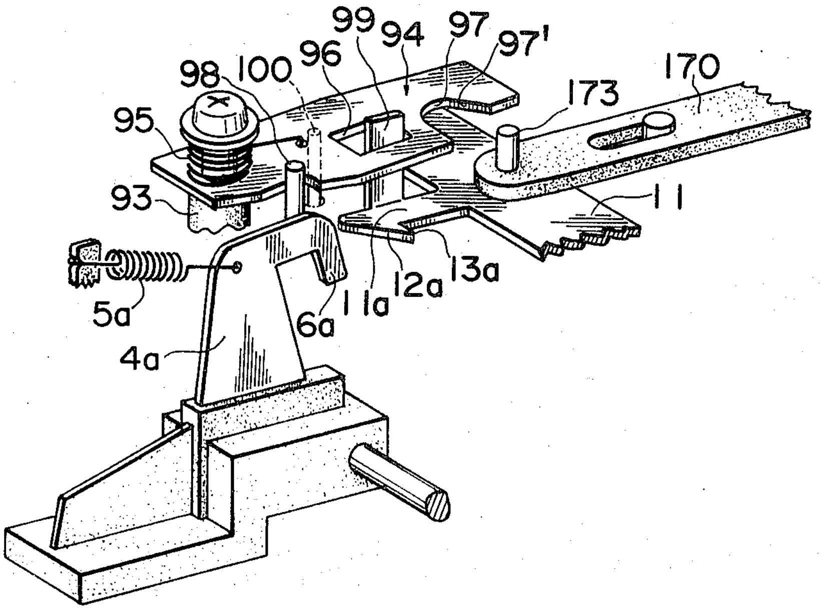
FIGS. 7(A), (B) and (C) are schematic views of the automatic stop motion mechanism according to another embodiment of the present invention.
Figure 7B:
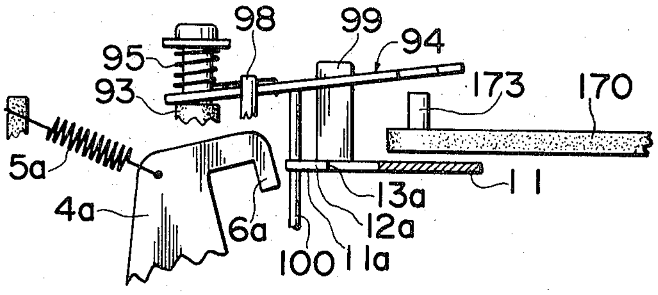

FIGS. 7(A), (B), and (C) illustrate another embodiment of the automatic stop motion mechanism according to the present invention. In this alternative embodiment, a shaft 93 is studded, for example, in the back side of the chassis 1 near that end of the lock lever 11 which is adjacent to fast-forward key leg 4*a*, and an actuator member 94 is mounted for pivotal movement on the shaft 93 against the force of a spring 95. The actuator member 94 has an aperture 96 formed substantially centrally thereof, and a cut-away 97 formed in the free end portion and having an oblique side 97'. A stop pin 98 is provided for the actuator member 97. In the engaging portion 13*a* of the lock lever 11 adapted to engage the fast-forward key 4*a*, a vertical retainer member 99 is integrally provided on that side opposite to the hook-shaped portion. The retainer member 99 is received in the aperture 96 of the actuator member 94. A slider bar 170 has a pin 173 at one end thereof, the pin 173 being projected in the direction opposite to that of the pin 73 shown in the embodiment of FIG. 3. A rod 100 is connected to the actuator plate 7 (see FIG. 1) interlocking with the respective keys. The rod 100 bears against the actuator member 94 to urge it away from the slider bar 170 as shown in FIG. 7(B), when the actuator plate 7 is not tilted in the manner described previously.

Figure 7C:
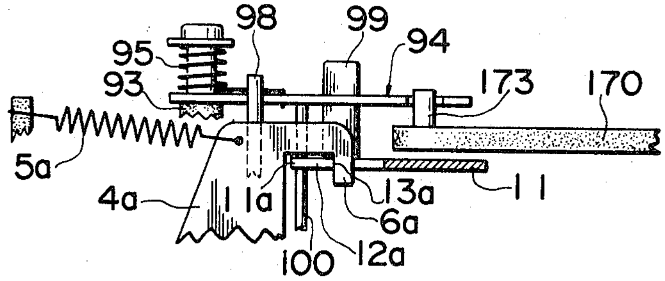

It is assumed that a key, e.g. fast-forward key FF is depressed and locked by the lock lever 11 in the manner as shown in FIG. 7(C). Then, the rod 100 is retracted to bring about a substantially horizontal position of the actuator member 94. In this case, the pin 173 on the slider bar 170 is engaged with the cut-away 97 of the actuator member 94 as shown, depending on the position of the slider bar. In this position, the magnetic tape is being fast-forward and when the tape has been fully taken up, the slider bar 170 is slidden away from the lock lever 11 just in the same way as described with respect to FIGS. 3 to 5. The pin 174 on the slider bar 170 moves along the oblique side 97' of the cut-away 97 in the actuator member 94 so that the actuator member 94 is pivoted counter-clockwise about the shaft 93, as viewed in FIG. 7(A). Such pivotal movement of the actuator member 94 causes the lock lever to slide in unlocking direction by the projection 99 being engaged with the aperture of the actuator member. Thus, an automatic stop motion function is accomplished just in the same way as described hereinbefore.

On the other hand, when the key is depressed, the pin 173 on the slider bar 170 may sometimes be deviated from the cut-away 97 of the actuator member 94 depending on the position of the slider bar 170. In such cases, the slider bar 170 is temporarily retracted with the locked position maintained, whereafter the slider bar is advanced to move the pin 173 into the cut-away 97. Thereafter, there will occur the same process of operation as described.

The embodiment described just above is advantageous in that a predetermined key may be locked in its depressed position independently of the position of the slider bar 170.

While the present invention has been described with respect to some specifc embodiments thereof, it is to be understood that the foregoing description is only exemplary of the invention and various modifications and changes may be made therein within the spirit and scope of the invention as defined in the appended claims.

What is claimed is:

1. A magnetic recording -reproducing device employing a tape casette which contains a pair of reels and a magnetic tape wound thereon and having the opposite ends thereof securely fixed to said pair of reels respectively, said device comprising a drive motor, keyboard including depressible keys adapted, when depressed, to energize said drive motor, a capstan adapted to be rotated at a predetermined speed by means of said drive motor, a pinch roller adapted to be brought into and out of engagement with said capstan, a pair of reel spindles on which said pair of reels contained in said tape cassette are mounted respectively, said reel spindle being adapted, upon depression of a key or keys of said keyboard, to be rotated in a predetermined direction by means of said drive motor until said magnetic tape is fully wound from one of said reels onto the other one, slidable lock means for locking said key or keys in depressed position, and an automatic stop motion mechanism operatively associated with one of said reel spindles, characterized in that said automatic stop motion mechanism comprises slidable unlock means operatively connected to said slidable lock means and slidable in a direction substantially perpendicular to the direction of the sliding movement of said slidable lock means to thereby cause the latter to be slidden in such a direction as to release the locked key or keys, an actuator means operatively connected to said drive motor in such a manner as to be pivotally moved in a first area when said reel spindles are rotated in a first direction and in a second area when said reel spindles are rotated in a second direction and to be rectilinearly moved between said first and second areas when said reel spindles are stopped from rotating because of said magnetic tape having been fully wound from said one reel onto said other reel, wherein when rectilinearly moved said actuator means is brought into operational engagement with said slidable unlock means to cause the latter to be slidden in such a direction that said slidable lock means is thereby slidden in said direction, whereby said locked key or keys are released and said device is automatically shut off, irrespective of the direction and speed of transportation of said magnetic tape.

2. A magnetic recording-reproducing device according to claim 1, wherein said unlock means is provided with a first control means for controling one end portion of said actuator means when the latter is pivotally moving in said first area and a second control means for controlling the other end portion of said actuator means when the latter is pivotally moving in said second area, thereby ensuring that said actuator means effects said movements.

3. A magnetic-reproducing device according to claim 1, further including a manually operable mechanism comprising means for bringing said pinch roller out of engagement with said capstan, means for interrupting rotation imparted to one of said reel spindles by said drive motor, and means for preventing said automatic stop motion mechanism from being operated due to said interruption of the rotation imparted to said one reel spindle, thereby making it possible to temporarily stop said magnetic tape from being transported during the recording or reproducing operation of said device.

* * * * *